(12) United States Patent
Song et al.

(10) Patent No.: US 11,955,282 B2
(45) Date of Patent: Apr. 9, 2024

(54) CAPACITOR COMPONENT

(71) Applicant: SAMSUNG ELECTRO-MECHANICS CO., LTD., Suwon-si (KR)

(72) Inventors: Ha Young Song, Suwon-si (KR); Jong Hoon Kim, Suwon-si (KR); Min Gon Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 82 days.

(21) Appl. No.: 17/554,184

(22) Filed: Dec. 17, 2021

(65) Prior Publication Data

US 2023/0117761 A1 Apr. 20, 2023

(30) Foreign Application Priority Data

Oct. 15, 2021 (KR) .................. 10-2021-0137247

(51) Int. Cl.
*H01G 4/005* (2006.01)
*H01G 4/232* (2006.01)
*H01G 4/248* (2006.01)
*H01G 4/30* (2006.01)

(52) U.S. Cl.
CPC .......... *H01G 4/005* (2013.01); *H01G 4/2325* (2013.01); *H01G 4/248* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 8,995,109 B1* | 3/2015 | Tsutsumi | ................ | B32B 37/24 |
| | | | | 361/301.4 |
| 9,099,246 B1* | 8/2015 | Kitano | .................... | H01G 4/012 |
| 9,099,247 B1* | 8/2015 | Kitano | ................. | H01G 4/1227 |

(Continued)

FOREIGN PATENT DOCUMENTS

| | | | | |
|---|---|---|---|---|
| JP | 2019125705 A | * | 7/2019 | ............. H01G 4/012 |
| JP | 2020-77815 A | | 5/2020 | |

(Continued)

*Primary Examiner* — Dion R. Ferguson
(74) *Attorney, Agent, or Firm* — Morgan, Lewis & Bockius LLP

(57) ABSTRACT

A capacitor component includes a body including a dielectric layer and internal electrode layers, with the dielectric layer interposed therebetween; and an external electrode disposed on the body and connected to the internal electrode layers. Each of the internal electrode layers has a capacitance formation portion disposed to overlap an adjacent internal electrode layer, and a lead-out portion extending from the capacitance formation portion and connected to the external electrode. A ratio (H2/H1) of a height difference H2 to a height difference H1 is 0.2 or less, where the height difference H2 is a height difference between the capacitance formation portion and the lead-out portion of a lowermost internal electrode layer the height difference H1 is a height difference between the capacitance formation portion and the lead-out portion of an uppermost internal electrode layer. An average thickness of the dielectric layer is 420 nm or less.

11 Claims, 4 Drawing Sheets

(56) References Cited

U.S. PATENT DOCUMENTS

| | | | |
|---|---|---|---|
| 9,208,948 B2* | 12/2015 | Tsutsumi | H01G 4/1209 |
| 10,529,490 B1* | 1/2020 | Kwon | H01G 4/30 |
| 10,529,493 B1* | 1/2020 | Kwon | H01G 4/30 |
| 11,557,435 B2* | 1/2023 | Fukuma | H01G 4/248 |
| 2005/0264975 A1* | 12/2005 | Yamazaki | H01C 7/18 |
| | | | 361/301.1 |
| 2012/0327555 A1* | 12/2012 | Ahn | H01G 4/232 |
| | | | 361/321.1 |
| 2013/0319741 A1* | 12/2013 | Ahn | H05K 1/0271 |
| | | | 361/728 |
| 2016/0233024 A1* | 8/2016 | Kim | H01G 4/30 |
| 2016/0247632 A1* | 8/2016 | Tsukida | H01G 4/0085 |
| 2018/0061571 A1* | 3/2018 | Chung | H01C 7/10 |
| 2018/0166217 A1* | 6/2018 | Kato | H01G 4/012 |
| 2020/0066453 A1* | 2/2020 | Jeong | H01G 4/248 |
| 2020/0152385 A1* | 5/2020 | Ishizuka | H01G 4/232 |
| 2021/0287853 A1* | 9/2021 | Sasabayashi | H01G 4/30 |
| 2022/0208462 A1* | 6/2022 | Kim | H01G 4/30 |
| 2023/0117761 A1* | 4/2023 | Song | H01G 4/248 |
| | | | 361/301.4 |

FOREIGN PATENT DOCUMENTS

| | | |
|---|---|---|
| KR | 10-2015-0010684 A | 1/2015 |
| KR | 10-2016-0097818 A | 8/2016 |

* cited by examiner

CAPACITOR COMPONENT

CROSS-REFERENCE TO RELATED APPLICATION(S)

This application claims benefit of priority to Korean Patent Application No. 10-2021-0137247 filed on Oct. 15, 2021 in the Korean Intellectual Property Office, the disclosure of which is incorporated herein by reference in its entirety.

BACKGROUND

1. Field

The present disclosure relates to a capacitor component.

2. Description of Related Art

A multilayer ceramic capacitor (MLCC), a capacitor component, is an important chip component used in industries such as the communications, computing, home appliances, automobiles, or the like, due to their small size, high capacity, and ease of mounting, and, in particular, are a key passive element used in various electric, electronic, and information communication devices such as mobile phones, computers, digital TVs, and the like.

In general, the MLCC may be manufactured by screen-printing a conductive paste for forming an internal electrode layer on a dielectric green sheet, providing and stacking the dielectric green sheet on which the conductive paste is printed as a plurality of dielectric green sheets, and pressing the plurality of stacked dielectric green sheets to form a stack body, and sintering the stack body.

Meanwhile, in forming the stack body, a dielectric green sheet disposed in a lower portion thereof may be pressed as many times as the number to be stacked. Therefore, a thickness of the dielectric green sheet disposed in the lower portion thereof may be thinner, as compared to a thickness of a dielectric green sheet disposed in an upper portion thereof. When the stack body is sintered, a phenomenon in which a breakdown voltage (BDV) of the MLCC decreases in the lower portion of the capacitor component may occur.

SUMMARY

An aspect of the present disclosure is to provide a capacitor component capable of improving withstand voltage properties.

According to an aspect of the present disclosure, a capacitor component includes a body including a dielectric layer and a plurality of internal electrode layers disposed to oppose each other, with the dielectric layer interposed therebetween; and an external electrode disposed on the body and connected to the plurality of internal electrode layers, wherein each of the plurality of internal electrode layers has a capacitance formation portion disposed to overlap an adjacent internal electrode layer, and a lead-out portion extending from the capacitance formation portion and connected to the external electrode, a ratio (H2/H1) of a height difference H2 between a capacitance formation portion and a lead-out portion of a lowermost internal electrode layer among the plurality of internal electrode layers disposed at the bottom with respect to a height difference H1 between a capacitance formation portion and a lead-out portion of an uppermost internal electrode layer among the plurality of internal electrode layers is 0.2 or less, and an average thickness of the dielectric layer is 420 nm or less.

According to an aspect of the present disclosure, a capacitor component includes a body including a dielectric layer and a plurality of internal electrode layers disposed to oppose each other, with the dielectric layer interposed therebetween; and an external electrode disposed on the body and connected to the plurality of internal electrode layers. Each of the plurality of internal electrode layers has a capacitance formation portion disposed to overlap an adjacent internal electrode layer, and a lead-out portion extending from the capacitance formation portion and connected to the external electrode. A height difference between the capacitance formation portion and the lead-out portion of a first outermost internal electrode layer among the plurality of internal electrode layers is different from a height difference between the capacitance formation portion and the lead-out portion of a second outermost internal electrode layer among the plurality of internal electrode layers. A location of an internal electrode layer having the smallest height difference between the capacitance formation portion and the lead-out portion among the plurality of internal electrode layers, excluding the first and second outermost internal electrode layers, deviates from a center of the plurality of internal electrode layers in a thickness direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
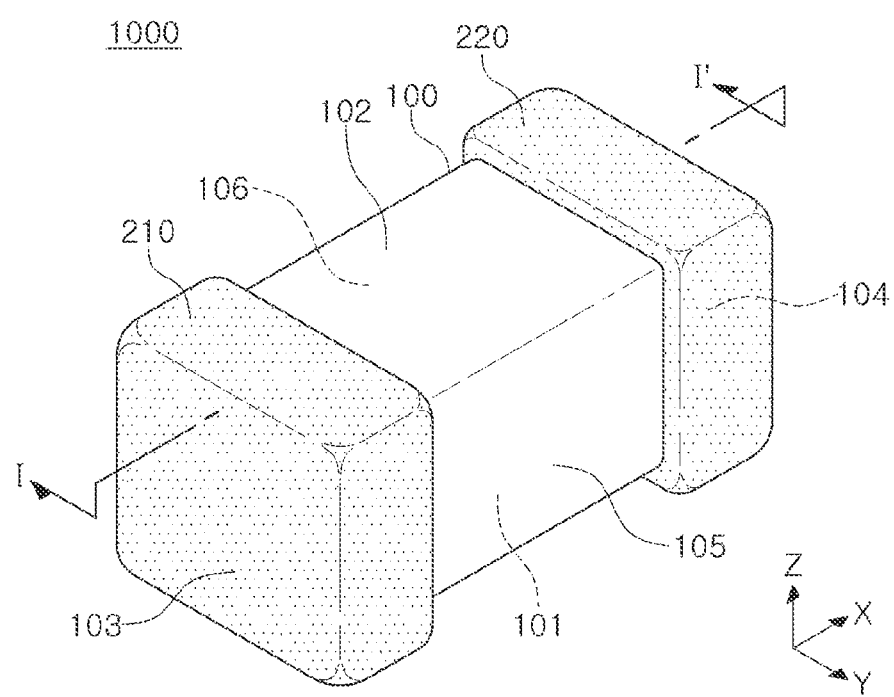
FIG. 1 is a perspective view schematically illustrating a capacitor component according to an embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a gravity direction.

The term "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, a first direction may be defined as a Z direction or a thickness direction, a second direction may be defined as an X direction or a length direction, and a third direction may be defined as a Y direction or a width direction.

Hereinafter, a capacitor component according to an embodiment of the present disclosure will be described in detail with reference to the accompanying drawings. Referring to the accompanying drawings, the same or corresponding components may be denoted by the same reference numerals, and overlapped descriptions will be omitted.

Figure 2:
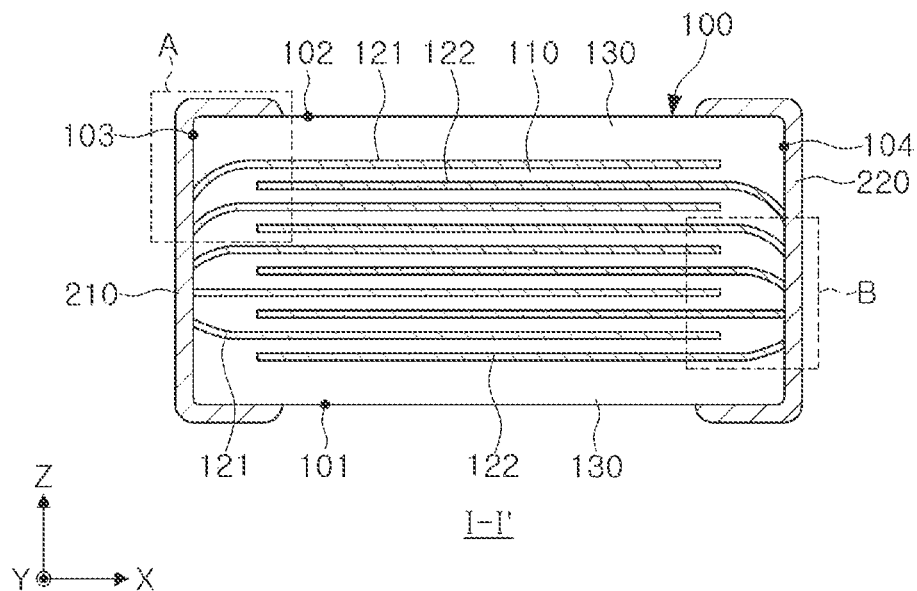
FIG. 2 is a view schematically illustrating a cross-section of FIG. 1, taken along line I-I'.
Figure 3:
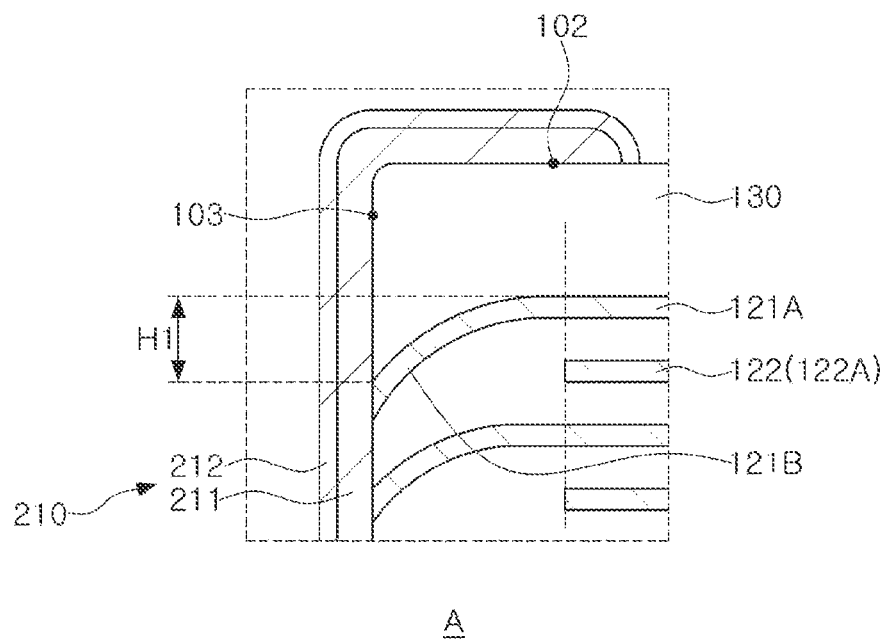
FIG. 3 is an enlarged view of portion A of FIG. 2.
Figure 4:
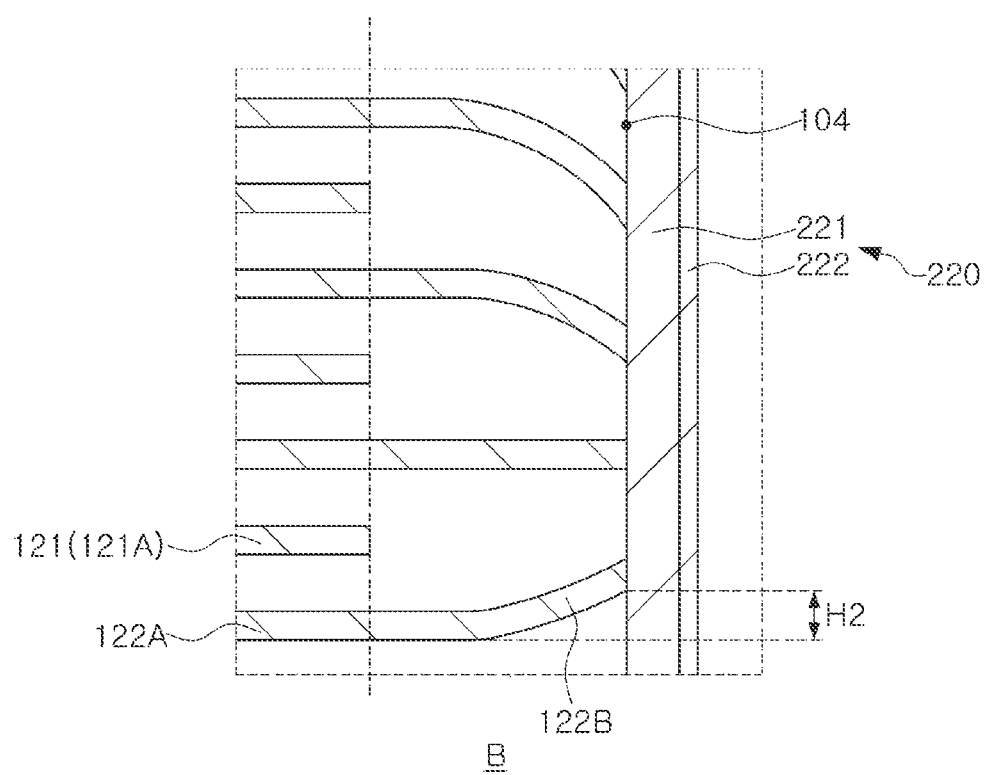
FIG. 4 is an enlarged view of portion B of FIG. 2.
Figure 5:
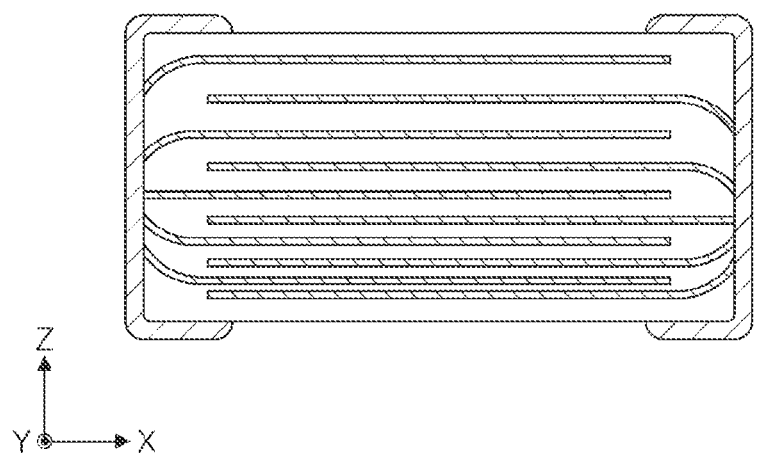
FIG. 5 is a view schematically illustrating a cross-section of a Comparative Example.
Figure 6:
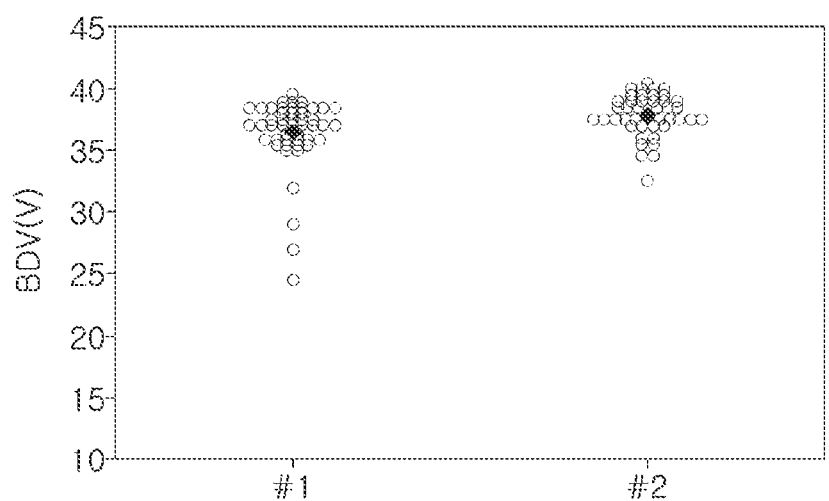
FIG. 6 is a view illustrating BDV destruction test data of Comparative Examples and Experimental Examples.

FIG. 1 is a perspective view schematically illustrating a capacitor component according to an embodiment of the present disclosure. FIG. 2 is a view schematically illustrating a cross-section of FIG. 1, taken along line I-I'. FIG. 3 is an enlarged view of portion A of FIG. 2. FIG. 4 is an enlarged view of portion B of FIG. 2. FIG. 5 is a view schematically illustrating a cross-section of a Comparative Example. FIG. 6 is a view illustrating BDV destruction test data of Comparative Examples and Experimental Examples.

Referring to FIGS. 1 to 4, a capacitor component 1000 according to this embodiment may include a body 100 and external electrodes 210 and 220. The body 100 may include a dielectric layer 110 and a plurality of internal electrode layers 121 and 122.

The body 100 may form an exterior of the capacitor component 1000 according to this embodiment. Although a specific shape of the body 100 is not particularly limited, as illustrated, the body 100 may have a hexahedral shape or a shape similar thereto. Due to shrinkage of a ceramic powder included in the body 100 during a sintering process, the body 100 may not have a hexahedral shape having perfect straight lines, but may have a substantially hexahedral shape.

Based on FIGS. 1 and 2, the body 100 may include a first surface 101 and a second surface 102 opposing each other in a thickness direction (Z), a third surface 103 and a fourth surface 104 opposing each other in a length direction (X), and a fifth surface 105 and a sixth surface 106 opposing each other in a width direction (Y). Each of the third to sixth surfaces 103, 104, 105, and 106 of the body 100 may be a wall surface of the body 100 connecting the first surface 101 and the second surface 102 of the body 100. Hereinafter, both end surfaces (one end surface and the other end surface) of the body 100 may refer to the third surface 103 and the fourth surface 104 of the body 100, respectively, and both side surfaces (one side surface and the other side surface) of the body 100 may refer to the fifth surface 105 and the sixth surface 106 of the body 100, respectively. In addition, one surface and the other surface of the body 100 may refer to the first surface 101 and the second surface 102 of the body 100, respectively. The one surface 101 of the body 100 may be used as a mounting surface, when the capacitor component 1000 according to this embodiment is mounted on a mounting substrate such as a printed circuit board.

The body 100 may include a dielectric layer 110 and first and second internal electrode layers 121 and 122, alternately arranged, with the dielectric layer 110 interposed therebetween. The dielectric layer 110, the first internal electrode layer 121, and the second internal electrode layer 122 may be provided in a plurality of layers. Hereinafter, the first and second internal electrode layers 121 and 122 will be collectively referred to as internal electrode layers 121 and 122, except for a case in which distinction is required. Accordingly, a description of a portion commonly referred to as the internal electrode layers 121 and 122 may be commonly applied to a plurality of first internal electrode layers 121 and a plurality of second internal electrode layers 122.

A plurality of dielectric layers 110 forming the body 100 may be provided as a sintered state, and a boundary between adjacent dielectric layers 110 may be integrated to the extent that it may be difficult to check without using a scanning electron microscope (SEM).

A raw material for forming the dielectric layer 110 is not particularly limited as long as it may obtain sufficient capacitance, and may be, for example, barium titanate ($BaTiO_3$) powder. As a material for forming the dielectric layer 110, various ceramic additives, organic solvents, plasticizers, binders, dispersants, or the like may be added to powder such as barium titanate ($BaTiO_3$) powder or the like according to the purpose of the present disclosure.

In a thickness of the dielectric layer 110, a thickness of an uppermost dielectric layer 110 may be substantially identical to a thickness of a lowermost dielectric layer 110, based on directions illustrated in FIG. 2. In this case, the expression "a thickness of an uppermost dielectric layer 110 may be substantially identical to a thickness of a lowermost dielectric layer 110" may mean that both are numerically identical to each other according to a method for measuring a thickness of a dielectric layer 110 to be described later, as well as, for example, cases with a difference within 5%. That is, one or ordinary skill in the art would understand that the expression "substantially identical" refers to being identical by allowing process errors, positional deviations, and/or measurement errors that may occur in a manufacturing process. In general, since a lowermost dielectric layer among the plurality of dielectric layers undergoes the most pressing process than other dielectric layers, the lowermost dielectric layer may be formed to be relatively thinner than an uppermost dielectric layer. In this embodiment, for example, in the pressing process after the stacking process, relatively high pressure may be applied to the uppermost dielectric layer 110, and relatively low pressure may be applied to the lowermost dielectric layer, to have substantially the same thickness between the two dielectric layers. In addition, each of the plurality of dielectric layers 110 may have the same thickness. A thickness of each of the dielectric layers 110 may be measured using an optical image or an SEM image obtained by scanning an X-Z cross-section in which the capacitor component is cut in a central portion in the width direction (Y). For example, a thickness of the dielectric layer 110 may refer to an arithmetic mean value by selecting one of the dielectric layers 110 shown in the image, and measuring a dimension in the Z direction of the selected one dielectric layer 110 multiple times in the X direction. The plurality of measurements in the X direction may be performed at equal intervals in the X direction, but are not limited thereto.

An average thickness of the plurality of dielectric layers 110 may be 420 nm or less. When the average thickness of the plurality of dielectric layers 110 exceeds 420 nm, it may be disadvantageous to reduce an entire thickness of a capacitor component. In this case, the average thickness of the plurality of dielectric layers 110 may refer to an arithmetic mean determined by obtaining thicknesses of the plurality of dielectric layers 110 shown in the image by the above-described method, and dividing a sum of the thicknesses by the total number of the dielectric layers 110 shown in the image. In addition, the expression of "thicknesses of the above-described dielectric layers 110 are substantially identical to each other" may refer that a thickness of each of the dielectric layers is within 5% of the above-described arithmetic mean value.

A cover layer 130 may be disposed on and below the body 100, e.g., both end portions in the thickness direction (in the Z direction). The cover layer 130 may serve to maintain reliability of the capacitor component against external impacts. The cover layer 130 may be formed using a material for forming the dielectric layer 110 or a material, different from the material for forming the dielectric layer 110. For example, in the latter case, the material for forming the dielectric layer 110 and the material for forming the cover layer 130 may be different from each other in terms of at least one of a composition, size, amount, or a dispersion degree of ceramic particles in each of the materials, or may be different from each other in terms of at least one of a composition, size, amount, or a dispersion degree of sub-elements in each of the materials.

The internal electrode layers 121 and 122 may be alternately arranged with the dielectric layer 110, and may include first and second internal electrode layers 121 and 122. The first and second internal electrode layers 121 and 122 may be alternately arranged to oppose each other, with the dielectric layer 110 interposed therebetween, and may be exposed from the third and fourth surfaces 103 and 104 of the body 100, respectively.

The internal electrode layers 121 and 122 may have capacitance formation portions 121A and 122A disposed to overlap other adjacent internal electrode layers 121 and 122, and lead-out portions 121B and 122B extending from the capacitance formation portions 121A and 122A and connected to the external electrodes 210 and 220 to be described later.

The capacitance formation portions 121A and 122A of the internal electrode layers 121 and 122 may have a shape similar to that of a plate as a whole. The capacitance formation portions 121A and 122A of the internal electrode layers 121 and 122 may form capacitance together with the capacitance formation portions 121A and 122A of other adjacent internal electrode layers 121 and 122 via the dielectric layer 110, when an electric field is applied through the external electrodes 210 and 220.

The lead-out portions 121B and 122B of the internal electrode layers 121 and 122 may be alternately exposed from the third surface 103 and the fourth surface 104 of the body 100 that may be both end surfaces in the length direction X, and may be connected to the first and the second external electrodes 210 and 220, respectively. For example, the lead-out portion 121B of the first internal electrode layer 121 may be exposed from the third surface 103 of the body 100, and may be connected to the first external electrode 210. The lead-out portion 122B of the second internal electrode layer 122 may be exposed from the fourth surface 104 of the body 100, and may be connected to the second external electrode 220. Therefore, the first internal electrode layer 121 may be spaced apart from the fourth surface 104 of the body 100 by a predetermined distance, and the second internal electrode layer 122 may be spaced apart from the third surface 103 of the body 100 by a predetermined distance.

At least one of the internal electrode layers 121 and 122 may have a height difference (a height difference in the Z direction in FIG. 2) between the capacitance formation portions 121A and 122A and the lead-out portions 121B and 122B, respectively. In this embodiment, as the height difference between the respective capacitance formation portions 121A and 122A and the respective lead-out portions 121B and 122B, an uppermost first internal electrode layer 121 and a lowermost second internal electrode layer 122 may have height differences H1 and H2, respectively. In addition, in this embodiment, in the height difference between the respective capacitance formation portions 121A and 122A and the respective lead-out portions 121B and 122B, the height difference of the uppermost first internal electrode layer 121 may be greater than the height difference of the lowermost second internal electrode layer 122 (H1>H2). For example, in processes of stacking and compressing a plurality of dielectric green sheets, relatively high compression pressure applied to the uppermost first internal electrode layer 121, as compared to the lowermost second internal electrode layer 122, may be performed by asymmetric compression, but the scope of the present disclosure is not limited thereto.

A height difference H1 between the capacitance formation portion 121A and the lead-out portion 121B in the uppermost first internal electrode layer 121 and a height difference H2 between the capacitance formation portion 122A and the lead-out portion 122B in the lowermost second internal electrode layer 122 may satisfy H2/H1≤0.2. As a non-limiting example, the asymmetric compression described above may be implemented by increasing compression pressure applied to an upper side of a stack body to be greater than compression pressure applied to a lower side of the stack body.

In each of the uppermost first internal electrode layer 121 and the lowermost second internal electrode layer 122, the lead-out portions 121B and 122B may be disposed closer to a center of the body 100 in the thickness direction (Z) than the capacitance formation portions 121A and 122A. Therefore, a height of the uppermost first internal electrode layer 121 in the thickness direction Z may increase from the third surface of the body 100, from which the lead-out portion 121B is exposed, toward the capacitance formation portion 121A. In addition, a height of the lowermost second internal electrode layer 122 in the thickness direction Z may decrease from the fourth surface of the body 100, from which the lead-out portion 122B is exposed, toward the capacitance formation portion 122A.

A height difference between the respective capacitance formation portions 121A and 122A and the respective lead-out portions 121B and 122B of the internal electrode layers 121 and 122 may decrease and increase again in a direction from the uppermost first internal electrode layer 121 toward the lowermost second internal electrode layer 122. As a result, a height difference between the respective capacitance formation portions 121A and 122A and the respective lead-out portions 121B and 122B of the internal electrode layers 121 and 122 may be minimum in any one of remaining internal electrode layers 121 and 122, except for the uppermost first internal electrode layer 121 and the lowermost second internal electrode layer 122. In this case, any one of the internal electrode layers 121 and 122 having the smallest height difference between the respective capacitance formation portions 121A and 122A and the respective lead-out portions 121B and 122B may be disposed closer to the lowermost second internal electrode layer 122, compared to the uppermost first internal electrode layer 121. That is, a location of the internal electrode layer having the smallest height difference among the plurality of internal electrode layers 121 and 122, excluding the uppermost and lowermost internal electrode layers, deviates from a center of the plurality of internal electrode layers 121 and 122 in the thickness direction (Z). As a non-limiting example, in the asymmetric compression described above, by increasing compression pressure applied to an upper side of a stack body to be greater than compression pressure applied to a lower side of the stack body, this may be because equilibrium between the upper pressing pressure and the lower pressing pressure is achieved in the stack body, and may be because equilibrium between the upper pressing pressure and the lower pressing pressure is achieved relatively on the lower side of the stack body.

The internal electrode layers 121 and 122 may include, for example, one or more conductors of palladium (Pd), silver (Ag), nickel (Ni), and copper (Cu). For example, the internal electrode layers 121 and 122 may be formed by stacking a conductive paste including a conductive powder including nickel (Ni), a binder, a solvent, and the like, on a dielectric green sheet and then sintering the same. The internal electrode layers 121 and 122 may include nickel (Ni).

The internal electrode layers 121 and 122 may have a thickness of 10 nm or more and 500 nm or less, respectively. When the thickness of each of the internal electrode layers 121 and 122 is less than 10 nm, connectivity of the internal electrode layers 121 and 122 may be deteriorated, to reduce capacitance thereof. When the thickness of each of the internal electrode layers 121 and 122 is greater than 500 nm, it may be difficult to achieve electrical insulation between the internal electrode layers 121 and 122, because a dielectric layer 110 having a thin thickness is formed, based on a component having the same size. A thickness of each of the internal electrode layers 121 and 122 may be measured using an optical image or an SEM image obtained by scanning an X-Z cross-section in which the capacitor component is cut in a central portion in the width direction (Y). For example, a thickness of each of the internal electrode layers 121 and 122 may refer to an arithmetic mean value by selecting one of each of the internal electrode layers 121 and 122 shown in the image, and measuring multiple times in the X direction a dimension in the Z direction of the selected one internal electrode layer. The plurality of measurements in the X direction may be performed at equal intervals in the X direction, but are not limited thereto. In addition, a thickness of each of the internal electrode layers 121 and 122 may refer that thicknesses of each of the internal electrode layers 121 and 122 shown in the image are obtained by the above-described method, and a sum of the thicknesses may be divided by the total number of each of the internal electrode layers 121 and 122 shown in the image.

A void and a ceramic particle may be disposed in the internal electrode layers 121 and 122. The ceramic particle may be formed by ceramic powder, such as barium titanate or the like, additionally added to the conductive paste for forming the internal electrode layer. The ceramic particle may be made of a barium titanate-based material in the same manner as a dielectric of the dielectric layer 110, but is not limited thereto. The void may be formed due to diffusion and recrystallization in the sintering process of nickel (Ni) powder included in the conductive paste, or may be formed by removing an organic material, such as a solvent or the like, included in the conductive paste during the sintering process.

The external electrodes 210 and 220 may be disposed on the body 100, and may be connected to the internal electrode layers 121 and 122. As illustrated in FIGS. 1 and 2, the external electrodes 210 and 220 may be respectively disposed on the third and fourth surfaces 103 and 104 of the body 100, to include first and second external electrodes 210 and 220 respectively connected to the first and second internal electrode layers 121 and 122.

The first and second external electrodes 210 and 220 may include first and second connection portions respectively disposed on the third and fourth surfaces 103 and 104 of the body 100 and respectively connected to the first and second internal electrode layers 121 and 122, and first and second extension portions respectively extending from the first and second connection portions to the first surface 101 of the body 100. The first and second extension portions may be disposed on the first surface 101 of the body 100 to be spaced apart from each other. The first and second extension portions may extend not only on the first surface 101 of the body 100, but also on the second, fifth and sixth surfaces 102, 105, and 106 of the body 100, but the scope of the present disclosure is not limited thereto. For example, as illustrated in FIG. 1, each of the external electrodes 210 and 220 of the present disclosure may be of a normal type formed on five (5) surfaces of the body 100, but is not limited thereto, and may be an L-type formed on two (2) surfaces of the body 100, a C-type formed on three (3) surfaces of the body 100, or the like.

The external electrodes 210 and 220 may include first layers 211 and 221 disposed on the body 100, and second layers 212 and 222 disposed on the first layers 211 and 221, respectively. The first layers 211 and 221 may be formed by sintering a sinterable conductive paste including a conductive metal including at least one of copper (Cu), silver (Ag), platinum (Pt), or palladium (Pd), and glass, may be formed by curing a curable conductive paste including a conductive metal including at least one of copper (Cu), silver (Ag), platinum (Pt), or palladium (Pd), and a base resin, or may be formed by vapor deposition, respectively. The second layers 212 and 222 may be formed by, for example, but not limited to, a plating method, respectively, and may include a nickel (Ni) plating layer and a tin (Sn) plating layer, sequentially plated on each of the first layers, respectively.

In this embodiment, although a structure in which the capacitor component 1000 has two external electrodes 210 and 220 is described, the number, a shape, or the like of respective external electrodes 210 and 220 may be changed according to a shape, or the like of respective internal electrode layers 121 and 122, or other purpose.

Experimental Example

FIG. 5 is a view schematically illustrating a cross-section of a Comparative Example. FIG. 6 is a view illustrating BDV destruction test data of Comparative Examples and Experimental Examples.

In a Comparative Example of FIG. 5 (Experimental Example 1 of FIG. 6), a dielectric layer on which an unsintered internal electrode layer was formed was sequentially stacked as a plurality of dielectric layers from a lower side, to form a stack body. In this case, pressing pressure was symmetrically applied on and below the stack body. In the Comparative Example (the Experimental Example 1 of FIG. 6), a ratio (H2/H1) of a height difference between a capacitance formation portion and a lead-out portion of a lowermost second internal electrode layer with respect to a height difference between a capacitance formation portion and a lead-out portion of an uppermost first internal electrode layer was 0.33. Next, in Experimental Example 2 of FIG. 6, a dielectric layer on which an unsintered internal electrode layer was formed was sequentially stacked as a plurality of dielectric layers from a lower side, to form a stack body. In this case, pressing pressure was asymmetrically applied above and below the stack body. In the Experimental Example 2, a ratio (H2/H1) of a height difference between a capacitance formation portion and a lead-out portion of a lowermost second internal electrode layer with respect to a height difference between a capacitance formation portion and a lead-out portion of an uppermost first internal electrode layer was 0.15. In the Experimental Examples 1 and 2 of FIGS. 5 and 6, an arithmetic mean of thicknesses of the plurality of dielectric layers was 420 nm. After preparing a plurality of samples of the same number satisfying each of Experimental Examples 1 and 2, breakdown voltages (BDV) of the samples were measured.

Referring to FIG. 6, an average breakdown voltage (represented by a rhombus in FIG. 6) of the Experimental Example 2 in which a ratio (H2/H1) of a height difference between a capacitance formation portion and a lead-out portion of a lowermost second internal electrode layer with respect to a height difference between a capacitance formation portion and a lead-out portion of an first internal electrode layer satisfies 0.2 or less, was 37.89 volts. It can be seen that this was higher than 36.48 volts, which was an average breakdown voltage (represented by a rhombus in FIG. 6) of Experimental Example 1. Also, referring to FIG. 6, it can be seen that, in distribution of breakdown voltages for each of the samples, Experimental Example 2 was shown to be relatively lower than Experimental Example 1. This may be because, in the Experimental Example 1, distribution in thickness between an upper dielectric layer and a lower dielectric layer was relatively greater due to the symmetric compression, and it can be judged that the lower dielectric layer has a region having relatively low BDV due to thin thickness thereof, as compared to other regions.

As a result, in the Experimental Example 2, withstand voltage properties may be maintained constantly while also improving the withstand voltage properties.

A capacitor component according to an aspect of the present disclosure may improve withstand voltage properties.

While example embodiments have been illustrated and described above, it will be apparent to those skilled in the art that modifications and variations could be made without departing from the scope of the present disclosure as defined by the appended claims.

What is claimed is:

1. A capacitor component comprising:
a body including a dielectric layer and a plurality of internal electrode layers disposed to oppose each other, with the dielectric layer interposed therebetween; and
an external electrode disposed on the body and connected to the plurality of internal electrode layers,
wherein each of the plurality of internal electrode layers has a capacitance formation portion disposed to overlap an adjacent internal electrode layer, and a lead-out portion extending from the capacitance formation portion and connected to the external electrode,
a ratio (H2/H1) of a height difference H2 to a height difference H1 is 0.2 or less, where the height difference H2 is a distance between the capacitance formation portion of a lowermost of the plurality of internal electrode layers and a region of the lead-out portion of the lowermost internal electrode layer contacting the external electrode and the height difference H1 is a distance between the capacitance formation portion of an upper most of the plurality of internal electrode layers and a region of the lead-out portion of the uppermost internal electrode layer contacting the external electrode, and
an average thickness of the dielectric layer is 420 nm or less.

2. The capacitor component of claim 1, wherein, in each of the uppermost internal electrode layer and the lowermost internal electrode layer, the lead-out portion is disposed closer to a center of the body in a thickness direction, compared to the capacitance formation portion.

3. The capacitor component of claim 2, wherein the lead-out portion of the uppermost internal electrode layer is disposed closer to the center of the body in the thickness direction, compared to the lead-out portion of the lowermost internal electrode layer.

4. The capacitor component of claim 3, wherein a height difference between the capacitance formation portion and the lead-out portion of an internal electrode layer decreases and then increases in a direction from the uppermost internal electrode layer toward the lowermost internal electrode layer.

5. The capacitor component of claim 4, wherein one of the plurality of internal electrode layers, excluding the uppermost internal electrode layer and the lowermost internal electrode layer, has the smallest height difference between the capacitance formation portion and the lead-out portion.

6. The capacitor component of claim 5, wherein the one of the plurality of internal electrode layers having the smallest height difference between the capacitance formation portion and the lead-out portion is disposed closer to the lowermost internal electrode layer, compared to the uppermost internal electrode layer.

7. The capacitor component of claim 1, wherein a thickness of an uppermost dielectric layer is substantially identical to a thickness of a lowermost dielectric layer.

8. The capacitor component of claim 1, wherein the external electrode comprises a first external electrode disposed on one end surface of the body and a second external electrode disposed on the other end surface of the body, opposing the one end surface of the body,
the lead-out portion of the uppermost internal electrode layer is exposed through the one end surface of the body to contact the first external electrode, and
the lead-out portion of the lowermost internal electrode layer is exposed through the other end surface of the body to contact the second external electrode.

9. The capacitor component of claim 8, wherein each of the first and second external electrodes comprises a first layer disposed on the body and a second layer disposed on the first layer.

10. The capacitor component of claim 9, wherein the first layer comprises at least one of copper (Cu), nickel (Ni), silver (Ag), platinum (Pt), or palladium (Pd).

11. The capacitor component of claim 10, wherein the second layer comprises at least one of nickel (Ni) or tin (Sn).

* * * * *